UNITED STATES PATENT OFFICE.

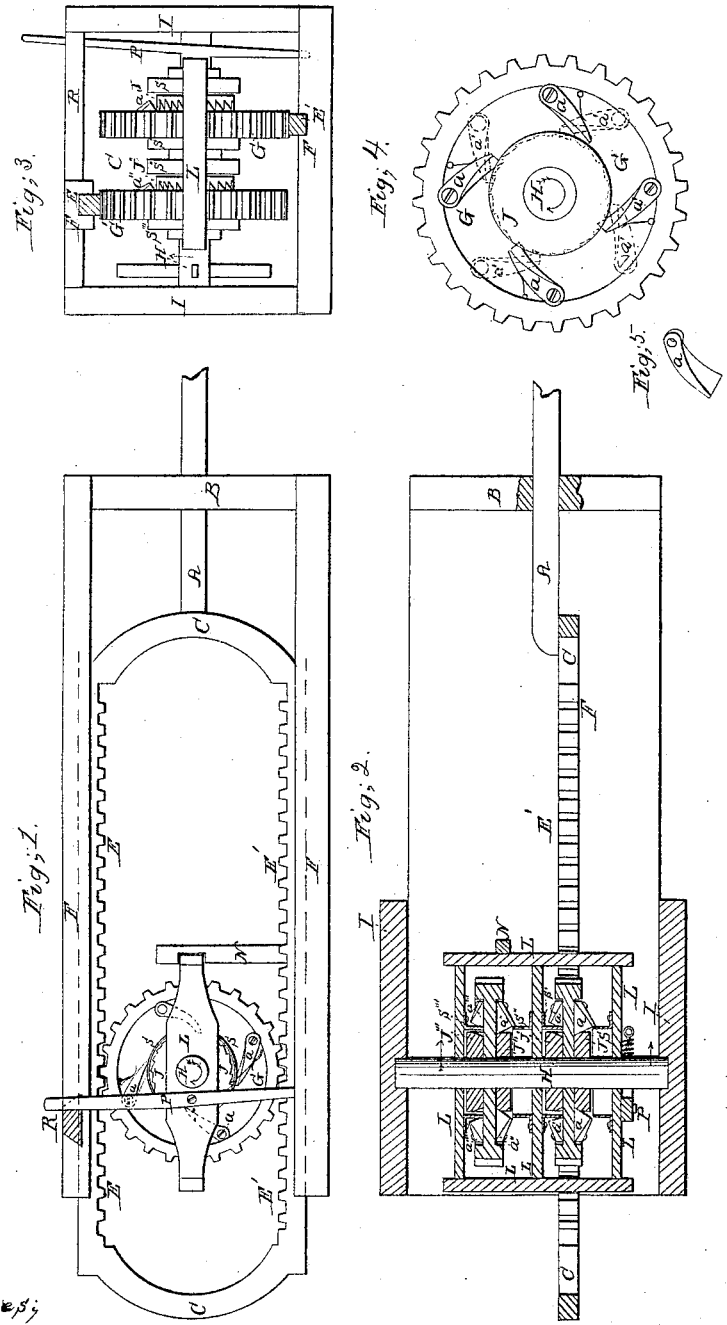

A. T. UNDERHILL, OF NEW YORK, N. Y., ASSIGNOR TO C. R. UNDERHILL, OF NEW CASTLE, NEW YORK.

CONVERTING RECIPROCATING INTO ROTARY MOTION.

Specification of Letters Patent No. 25,550, dated September 20, 1859.

*To all whom it may concern:*

Be it known that I, A. T. UNDERHILL, of the city, county, and State of New York, have invented a new and useful Improvement in Machinery for Converting Reciprocating Rectilinear Motion into Rotary Motion; and I do hereby declare that the following is a full, clear, and exact description of the same, reference being had to the accompanying drawings, making part of this specification, in which—

Figure 1, represents a side elevation of the contrivance. Fig. 2, is a horizontal section taken through the same showing the several parts in their relative positions for communicating the rotary motion in one direction. Fig. 3 is an end view of Fig. 1. Fig. 4, is a view of one gear wheel and ratchet wheel, showing the pawls and their arrangement upon the sides of the wheel. The red lines indicate those on the opposite side. Fig. 5 is a perspective view of one of the pawls detached from the wheel.

The several figures represented in the drawings show the machine as being operated in one direction, indicated by the arrows; it is only necessary in changing the direction of the parts to move the frame carrying the guards as hereinafter set forth.

A, represents the piston-rod passing through a standard B, and connected to the crosshead C, of horizontal racks E, E', which are guided in their movement in slideways F, F'. These racks are connected together by the cross-heads C, C, which are placed obliquely to a vertical line drawn through the center of the piston-rod; this rod being fixed midway between the two racks so that they will work perfectly true, creating as little friction as possible. One of these racks E meshes into the teeth of a spur-wheel G, and works under the said wheel, while the other rack E', operates the spur-wheel G', working above this wheel.

The wheels G, G', turn loosely upon the shaft H, which has its bearings in the standards I, I, and the motion communicated to these wheels by the two racks E, E, causes them to turn in opposite directions. On either side of each of the spur wheels G, G', are ratchet wheels J, J', J'', J''', which are all made fast to the shaft H. These ratchet wheels fit close to the sides of the spur wheels and serve in a great measure to keep the spur wheels steady. $a$, $a'$, $a''$, $a'''$, are pawls, which, being held down by springs, alternately take into the teeth on the ratchet wheels J, J'', as the racks slide back and forth, and communicate to the shaft H, a rotary motion in one direction. L, is a horizontal frame, the shaft H, forming its central bearings, while a vertical standard N, serves as an end support. This frame is capable of a free lateral motion and is operated by a spring lever P, which is held in either a forward or backward position by notches in a crosspiece R. To this frame are fixed cylindrical guards S, S', S'', S''', which move with the frame and serve to reverse the motion of the shaft as follows:—It will be seen by reference to Fig. 2 that the guards S, S'', are thrown from the ratchet wheels J, J'', and their pawls operate the shaft H, by the motion of the racks; while the ratchet wheels J', J''', are covered by the guards S', S''', and their pawls bear upon the surface of the guards which keep them from acting on the shaft. Now by throwing the frame L forward, the ends of the pawls being wedge-shaped, allows the guards S, S'', to pass under the pawls and cut off their action upon the ratchet wheels above referred to (J, J''); and at the same time the opposite set of pawls, which are reversed as indicated by the red lines in Fig. 4, are brought in contact with their ratchet wheels J', J''', and the motion given to the shaft H, is instantly reversed without in any way retarding the motion of either the engine or machinery. The opposite effect will be produced again by drawing the frame back to its former position.

What I claim as my invention, and desire to secure by Letters Patent, is:

The arrangement and combination of the frame I, guards S, S', S'', S''', and ratchet wheels J, J', J'', J''', substantially as herein shown and described, so that the rotation of the shaft H, may be reversed as set forth.

A. T. UNDERHILL.

Witnesses:
MICH. HUGHES,
W. HAUFF.